United States Patent [19]
Wiggins

[11] Patent Number: 4,547,859
[45] Date of Patent: Oct. 15, 1985

[54] METHODS FOR SCALING AND CALIBRATING PREDETERMINED SIGNALS

[75] Inventor: Gene D. Wiggins, Arlington, Tex.

[73] Assignee: S & W Instruments, Inc., Dallas, Tex.

[21] Appl. No.: 597,741

[22] Filed: Apr. 6, 1984

Related U.S. Application Data

[62] Division of Ser. No. 262,761, May 11, 1981, Pat. No. 4,456,963.

[51] Int. Cl.$^4$ .................. G06J 1/00; G06F 15/20; G01L 3/00
[52] U.S. Cl. .................. 364/571; 73/117.3; 364/582
[58] Field of Search .................. 364/571, 582

[56] References Cited

U.S. PATENT DOCUMENTS

| | | | |
|---|---|---|---|
| 4,125,896 | 11/1978 | Metcalf | 364/582 |
| 4,192,005 | 3/1980 | Kurtz | 364/571 |
| 4,193,039 | 3/1980 | Massa et al. | 364/571 |
| 4,254,469 | 3/1981 | Whitely | 364/571 |
| 4,348,732 | 9/1982 | Kreft | 364/571 |
| 4,357,668 | 11/1982 | Schwartz et al. | 364/571 X |
| 4,399,515 | 8/1983 | Gross | 364/571 |
| 4,423,487 | 12/1983 | Buckenham et al. | 364/571 X |
| 4,437,164 | 3/1984 | Branch, III | 364/571 |

OTHER PUBLICATIONS

Prazak et al.: Correcting Errors Digitally in Data Acquisition and Control, Electronics, Nov. 22, 1979, vol. 52, No. 24, pp. 123/128.

*Primary Examiner*—Felix D. Gruber
*Attorney, Agent, or Firm*—Kanz, Scherback & Timmons

[57] ABSTRACT

Methods are disclosed for scaling and calibrating predetermined signals in apparatus for measuring and displaying predetermined characteristics of reciprocating machines. In the preferred embodiment, the methods comprise the calibrating of a pressure data acquisition and scaling system to eliminate inaccuracies due to temperature related changes in component values due to such things as component aging, the scaling of an amplified signal from a pressure transducer suitable for display purposes and the cancelling of an amplified output signal from the pressure transducer when zero pressure is applied thereto.

2 Claims, 12 Drawing Figures

METHODS FOR SCALING AND CALIBRATING PREDETERMINED SIGNALS

This is a division of application Ser. No. 262,761 filed May 11, 1981 entitled "Apparatus and Method for Measuring and Displaying Performance Characteristics of Reciprocating Piston Machines", now U.S. Pat. No. 4,456,963, and assigned to the same assignee.

BACKGROUND OF THE INVENTION

1. Field of the Invention

The present invention relates in general to engine analysis and more particularly to apparatus and methods for indicating certain performance characteristics of machines having one or more cylinders with piston reciprocating therein, such as internal combustion engines, compressors, a machine combining both of these, etc.

2. Description of the Prior Art

In the gas transmission industry, it is necessary to compress and pressurize the natural gas prior to distribution of the gas over the pipeline network. Rather large engine-driven compressors are used to perform this compression function and the engines to rotate the compressors use fuel. A very real need exists to be able to measure the indicated horsepower of a reciprocating power cylinder or compressor cylinder in order to optimize the amount of power that is being generated and used and optimize the amount of fuel which is being used to generate that power and generally account for the energy that is being produced and used in, for instance, the gas transmission industry. The indicated horsepower of an internal combustion engine or a reciprocating piston type of compressor, can be determined by multiplying the area of the pressure-volume (P-V) card obtained from such cylinder by the crankshaft speed. The area of the P-V card can be expressed mathematically by the following equation: $A = \int p dv$, where p is the instantaneous pressure in the cylinder and dv is the first derivative of the instantaneous volume of the cylinder. Usually a signal representative of the instantaneous pressure in the cylinder can be obtained without too much difficulty. An accurate representation of the instantaneous volume of the cylinder is not easily obtained because the volume in the cylinder above the piston does not change at a constant rate.

The invention as claimed is intended to provide a solution for various prior art deficiencies providing a means to accurately and easily measure the indicated horsepower and also provides means for displaying other parameters, including crankshaft angle and piston position related events, on the engine or compressor which are of interest in carrying out preventative maintenance measures and schedules.

SUMMARY OF THE INVENTION

The present invention provides methods for scaling and calibrating predetermined signals in apparatus for measuring and displaying predetermined characteristics of reciprocating piston machines.

An improvement and advantage which is provided in the present invention is the self-calibration feature. Self-calibration in the sense that the inventive instrument performs a calibration to itself just prior to using the information that requires calibration as opposed to someone externally calibrating the instrument on a periodic basis, which is a problem with the prior art. Aging of components within the instrument circuitry would require one to go in and recalibrate the instrument on a periodic basis for the instrument to maintain its accuracy. That periodic recalibration is taken care of automatically in the present inventive analyzer.

A time-consuming problem on prior art engine compressor analyzers was the calibration of the vertical sensitivity of the pressure output circuitry and also the calibration of the instrument to the pressure transducer signal. The analyzer instrument needs to be informed as to the pressure that is being applied in the cylinder that is being analyzed. That information is transmitted to the analyzer via some sort of pressure transducer. The analyzer needs to be calibrated to the signal from the pressure transducer in such a way that the analyzer knows the amount of pressure that is being applied to the pressure transducer. That has been done in the past in a shop or laboratory type environment by applying a known accurate pressure to the pressure transducer and then adjusting various controls on the analyzer until the analyzer indicates the same amount of pressure that has been applied to the transducer. The inventive analyzer improves considerably on that prior art procedure by requiring that the operator simply enter into the analyzer, via a keyboard, the full-scale pressure range of the pressure transducer (500 psi or 1000 psi or whatever the full-scale range of the transducer might be). Then a number representing the sensitivity of the pressure transducer, for instance millivolts of output (full scale) per volt of excitation voltage applied to the transducer, is entered into the analyzer, via a keyboard. A source of calibrated pressure is not necessary to calibrate the inventive instrument to the pressure transducer. From that same input information, the instrument can provide the user with a pressure output signal, the sensitivity of which can be adjusted very easily by the operator. When the operator displays cylinder pressure versus some horizontal axis parameter, for instance, crank angle rotation, the operator would like the vertical sensitivity of the display to be some known number of psi per division of oscilloscope screen area; for instance, 50 psi per centimeter. In the prior art, the sensitivity was previously adjusted to be 50 psi per centimeter by applying, for instance, 50 psi and adjusting the display on your oscilloscope by various controls to give one centimeter of deflection. Now the inventive analyzer is informed by an operator entering data via a keyboard how many psi per division is wanted on the vertical deflection and then the instrument itself scales the output of the pressure transducer in such a way that it will provide this vertical sensitivity for the operator if the operator wll set the vertical range of the oscilloscope to the value which is displayed on the CRT screen of the analyzer. In other words, one enters how many psi per division is wanted and the instrument indicates a number which is equal to the vertical setting of your oscilloscope, as in 0.5 volts per divisions or 0.1 volt per division or something like that, and then sets his scope to that value and then the circuit is calibrated. So, again, one does not have to use any sort of calibrated pressure producing mechanism to do that.

One means for carrying out the invention is described in detail below with reference to the drawing, which illustrates only one specific embodiment, in which:

DESCRIPTION OF THE PREFERRED EMBODIMENT

Figure 1:
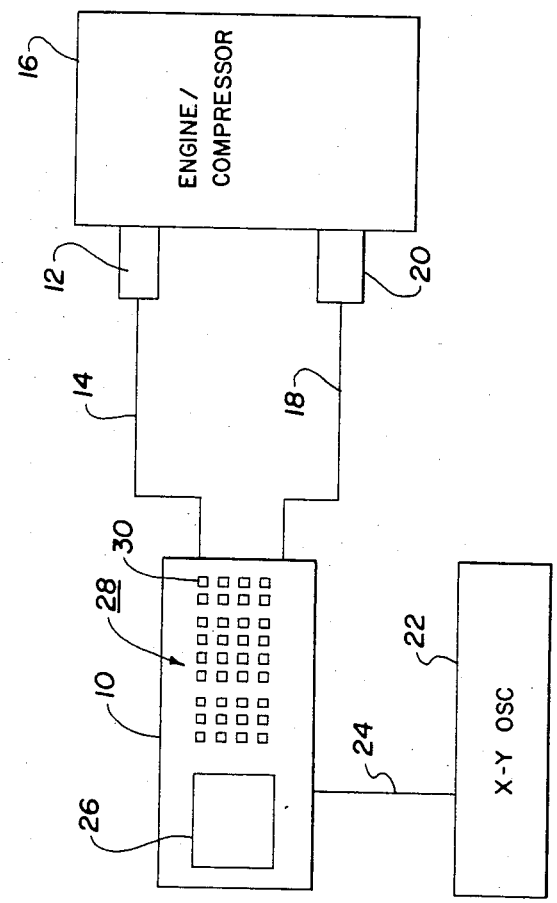
FIG. 1 is a simplified block diagram showing an engine/compressor analyzer coupled to a compressor or engine for analysis thereof.

Referring now to the drawing, and in particular to FIG. 1, an engine/compressor analyzer apparatus according to the present invention for analyzing certain performance characteristics of a reciprocating power cylinder or compressor cylinder is referred to generally by reference numeral 10. Analyzer 10 is electrically connected to pressure transducer 12 by cable 14 while pressure transducer 12 is physically coupled to the engine/compressor 16 which is going to be analyzed. Cable 18 electrically connects analyzer 10 to the crank angle or shaft encoder assembly 20 which is operatively coupled to the engine/compressor 16. Analyzer 10 is also electrically coupled to an X-Y oscilloscope 22 by cable 24. Analyzer 10 contains a cathode ray tube (CRT) display 26 and a keyboard assembly 28 comprising thirty-six active keyswitches 30.

In preparation of analyzing the engine/compressor 16 with analyzer 10, the operator would attach the crank angle encoder 20 via some sort of shaft arrangement so that the crank angle encoder 20 is rotating at the same speed as the engine/compressor 16. There are a number of acceptable methods to attach the crank angle encoder 20 but it must be attached in a manner such that there is not any skippage thereby insuring that the encoder 20 rotates at the same one-to-one relationship as the crankshaft. Then the operator must attach the pressure transducer 12 to the cylinder of the engine/compressor 16 that is going to be analyzed or indicated. A common method of attaching the pressure transducer 12 is through some type of indicator valve. The engine/compressor manufacturers sometimes provide indicator valves as part of the standard equipment of the engine or compressor. The pressure transducer 12 has an adaptor by which one can attach the pressure transducer 12 to the indicator valve and if an indicator valve is not on the equipment, one can be installed by the user. The industry in which this analyzer 10, or similar instruments, are being used is well aware of the indicator valves and nearly all engine/compressors 16 are equipped with an indicator valve. Having attached the pressure transducer, then cables 14 and 18 are attached from the pressure transducer 12 and the crank angle encoder 20 to connectors provided for their attachment on the back of the analyzer 10 and then their signals can be received and processed by the analyzer 10. The crank angle encoder 20 produces two signals on its output, one of which is a one pulse per revolution signal; in other words, a digital logic level change occurs each time the shaft of the encoder assembly make one revolution and it occurs at the same mechanical point each time. The other output channel of the encoder 20 provides a digital pulse or logic pulse at each degree of shaft rotation of the encoder 20. The pressure transducer 12 provides an output signal which is proportional to the pressure in the cylinder to which it is attached.

Pressure transducer 12 is typically a strain gauge type of transducer with a range of up to 5000 psi and an output of 20 millivolt for full scale. The crank angle or shaft encoder assembly 20 recommended for use with analyzer 20 is one similar to Model #701SR-360-ICLP-TTL-LD-SS available from Disc Instruments located in Costa Mesa, Calif.

The next thing the operator would do in using analyzer 10 is to synchronize the analyzer 10 to top dead center of the reference cylinder in the engine/compressor 16. The one pulse per revolution signal from the crank angle encoder 20 is conditioned by the analyzer 10 and then is sent out to a strobe light at the engine/compressor 16 and the strobe light flashes at the occurrence of each one pulse per revolution. By shining the strobe light on the flywheel of the engine compressor 16, the operator can, by turning the innertube of the crank angle encoder 20 with respect to the fixed outer tube, cause the one pulse per revolution signal to coincide in time with the occurrence at the reference cylinder reaching its top dead center (TDC) travel. The coincidence can be determined by noting when a designated mark on the flywheel of the engine/compressor 16 coincides or is in alignment with a pointer on the engine/compressor 16 as disclosed by the light from the strobe light. The operator can then lock down the inner tube of the encoder assembly 20 so that it cannot change from that setting. Now the analyzer 20 will receive a signal in the form of the one pulse per revolution signal which occurs at the exact instant in time that the reference cylinder is at the top-most portion of its travel. The analyzer 10 will also receive a signal which occurs each time the crankshaft rotates by one degree so that now the analyzer 10 basically knows where the crankshaft is in its rotation, knows when the reference cylinder reaches the very top of its travel, knows each degree that the crankshaft has turned and knows that the crankshaft has rotated one degree and each of those degrees.

Figure 2:
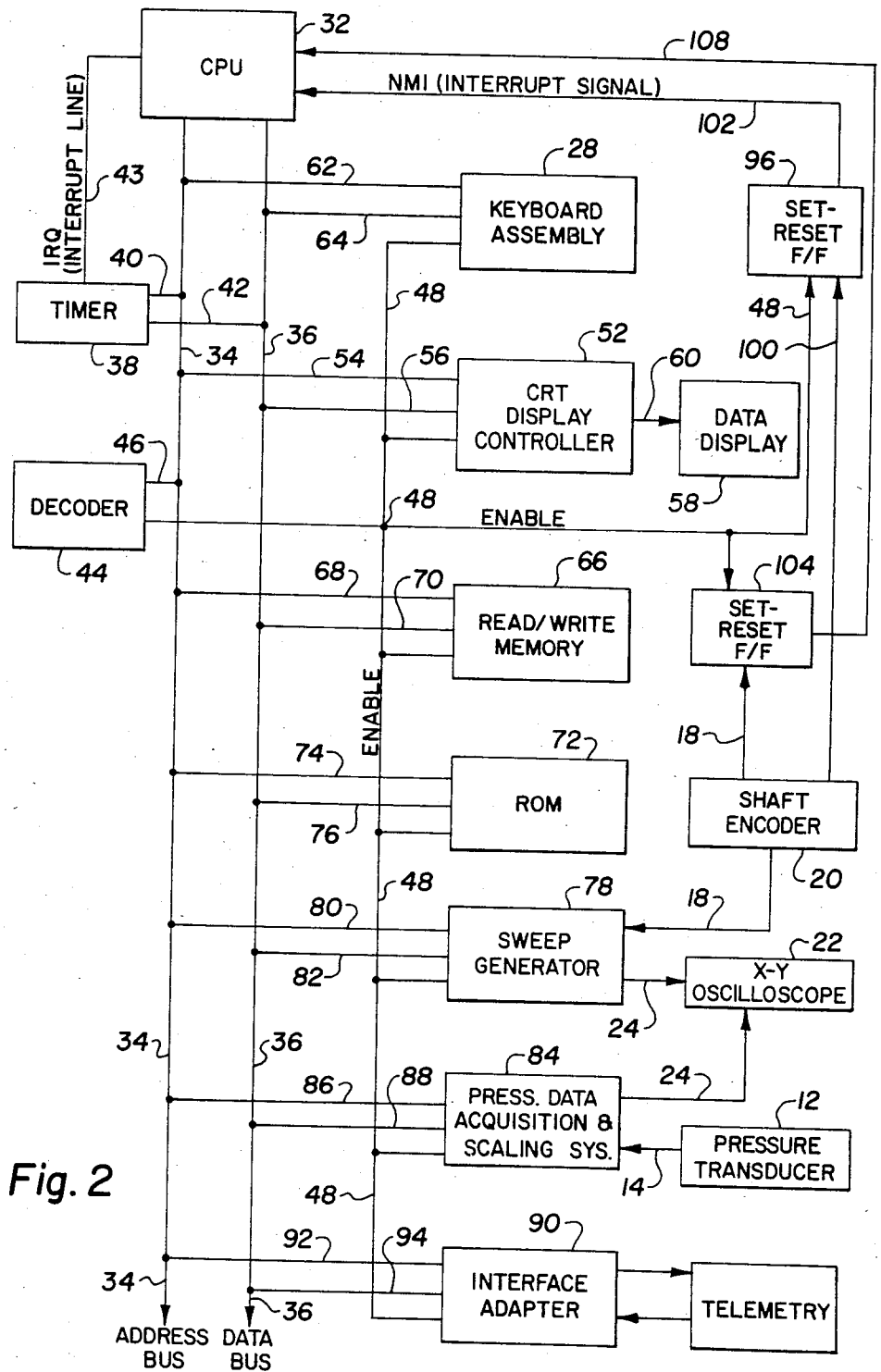
FIG. 2 is a simplified block diagram of an engine/compressor analyzer incorporating the principles of the present invention.
Figure 3A:
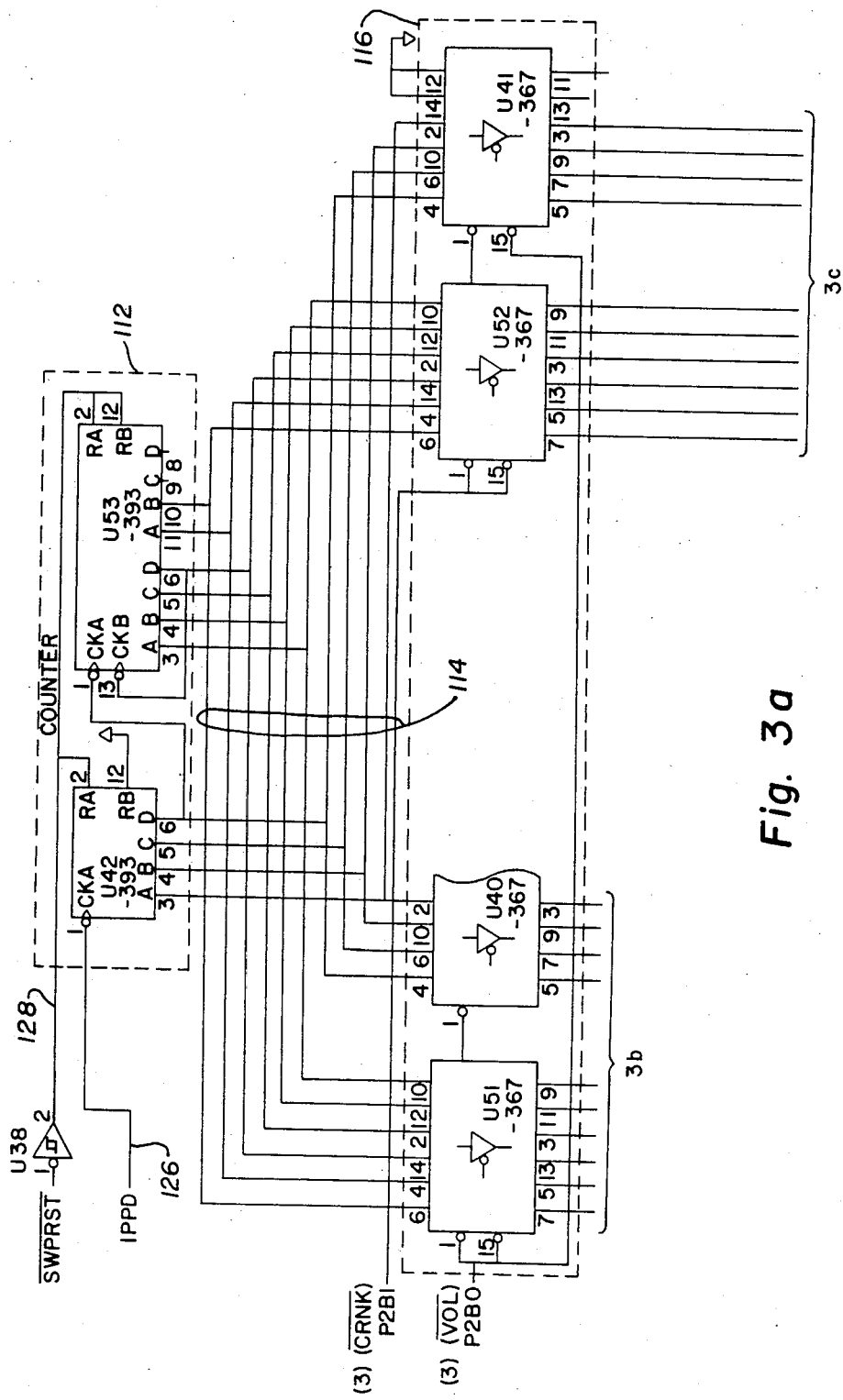
FIGS. 3a through 3d are a simplified schematic diagram of the sweep generator system.
Figure 3B:
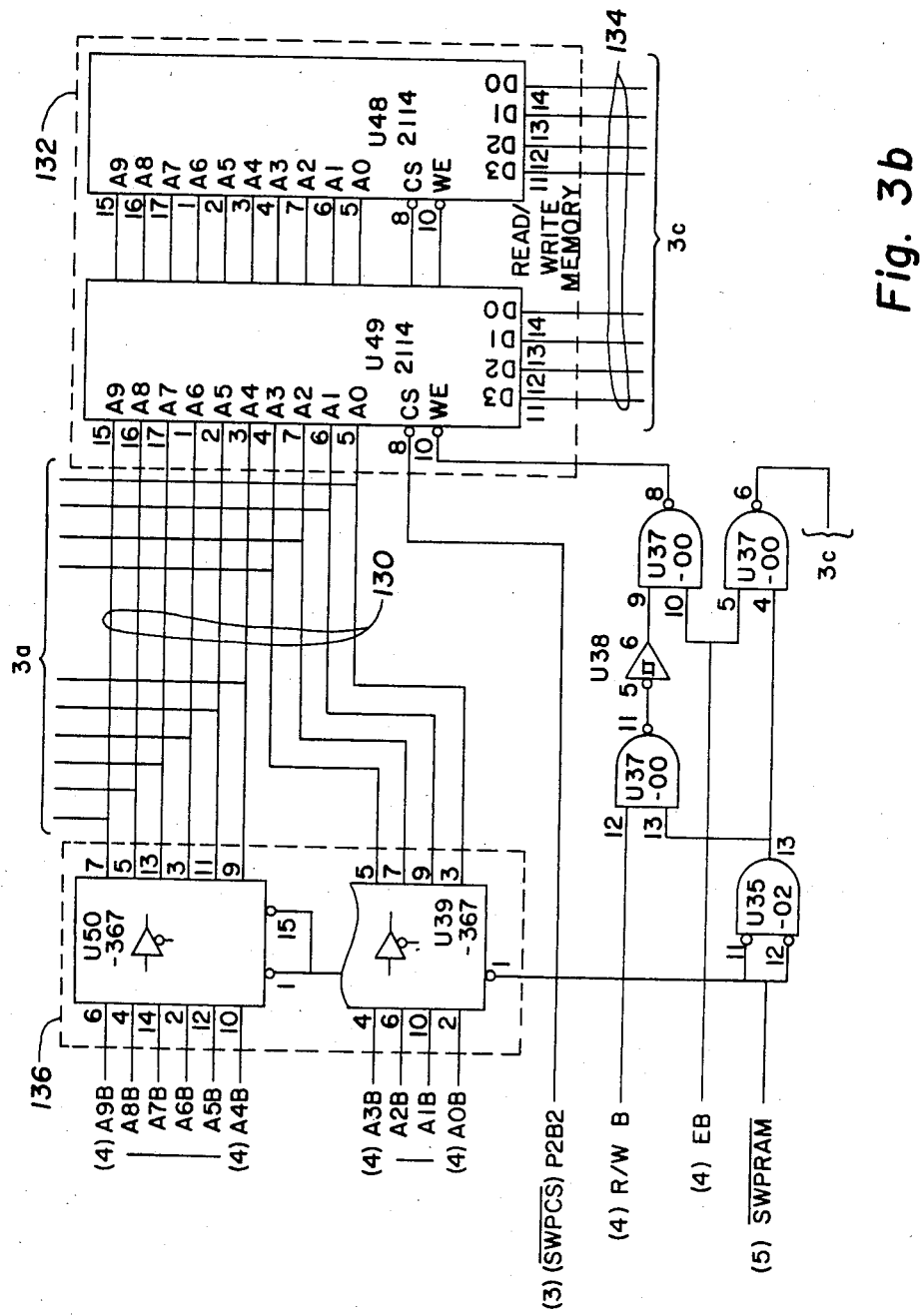
Figure 3C:
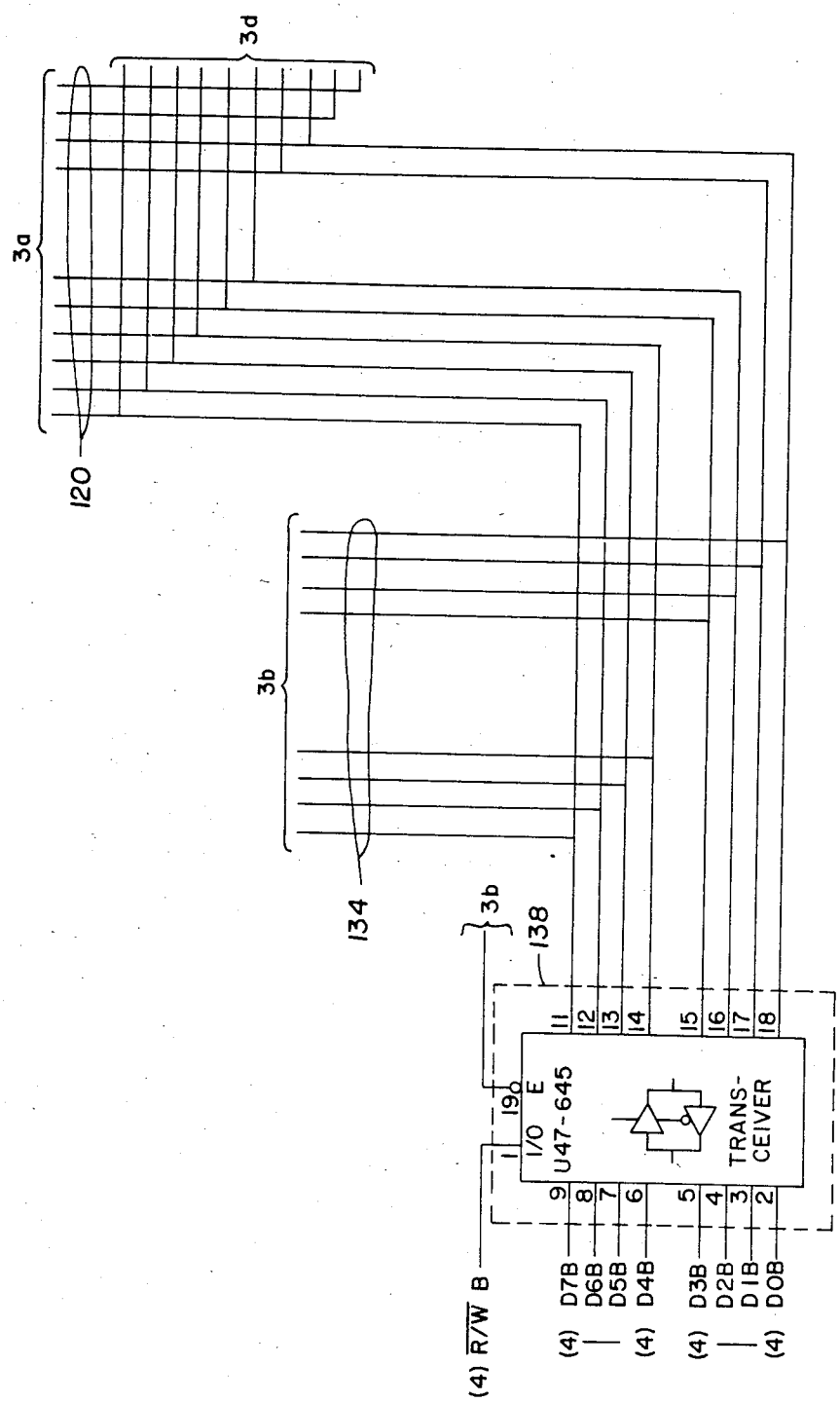
Figure 3D:
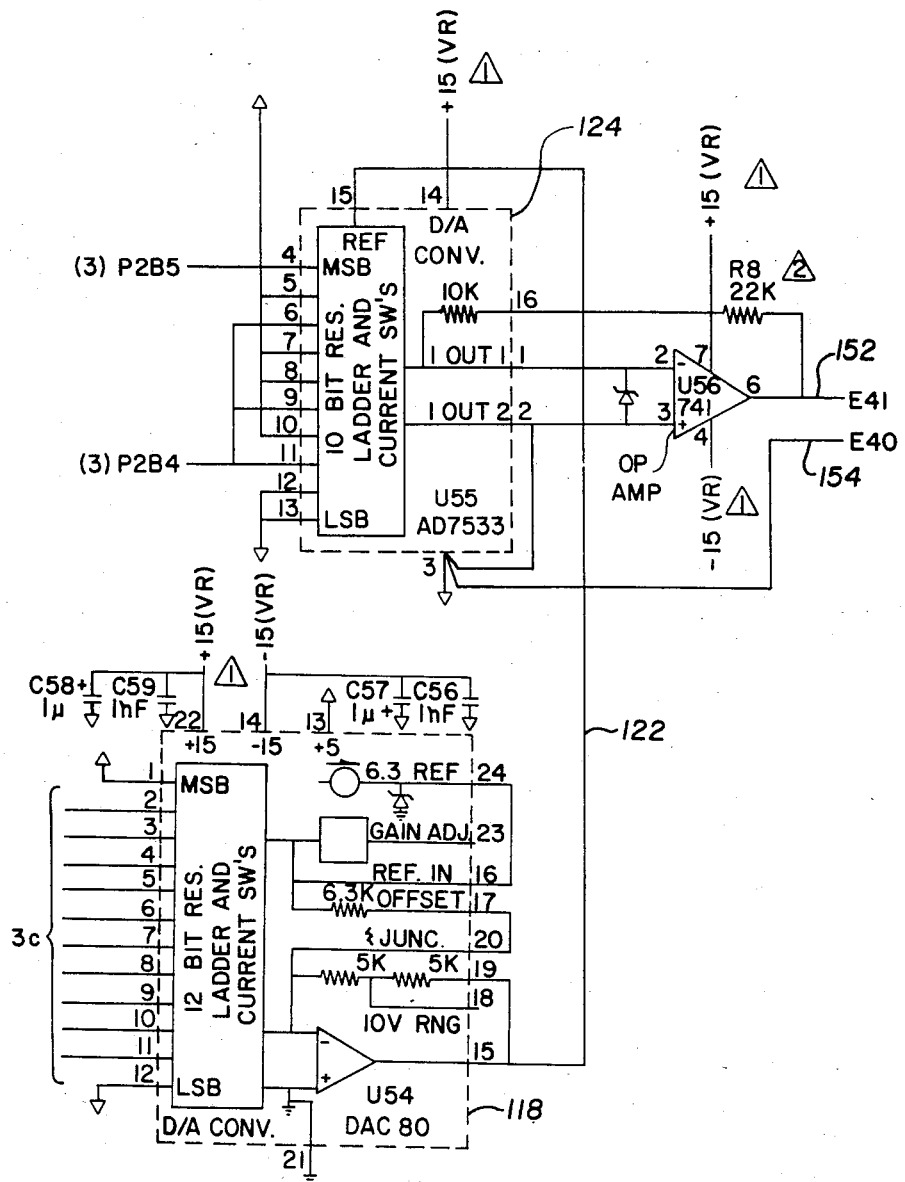
Figure 4A:
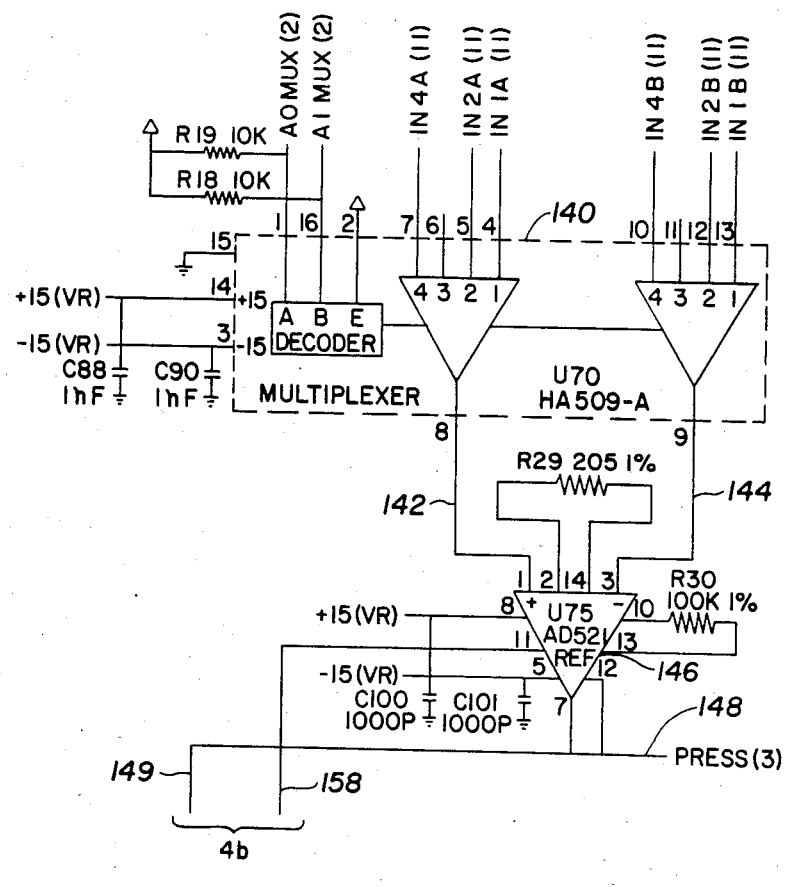
FIGS. 4a through 4d are a simplified schematic diagram of a first portion of the pressure data acquisition and scaling subsystem.
Figure 4B:
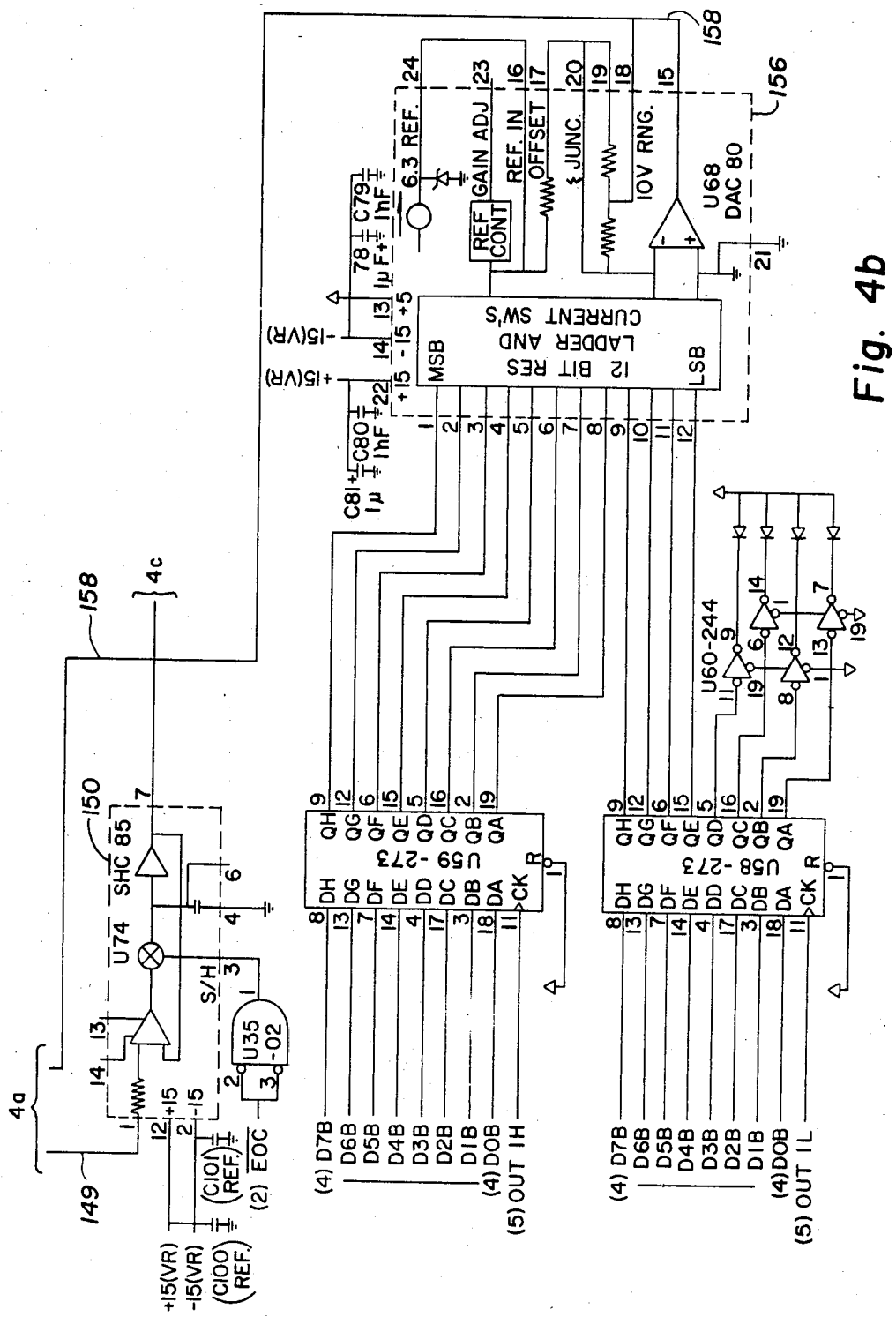
Figure 4C:
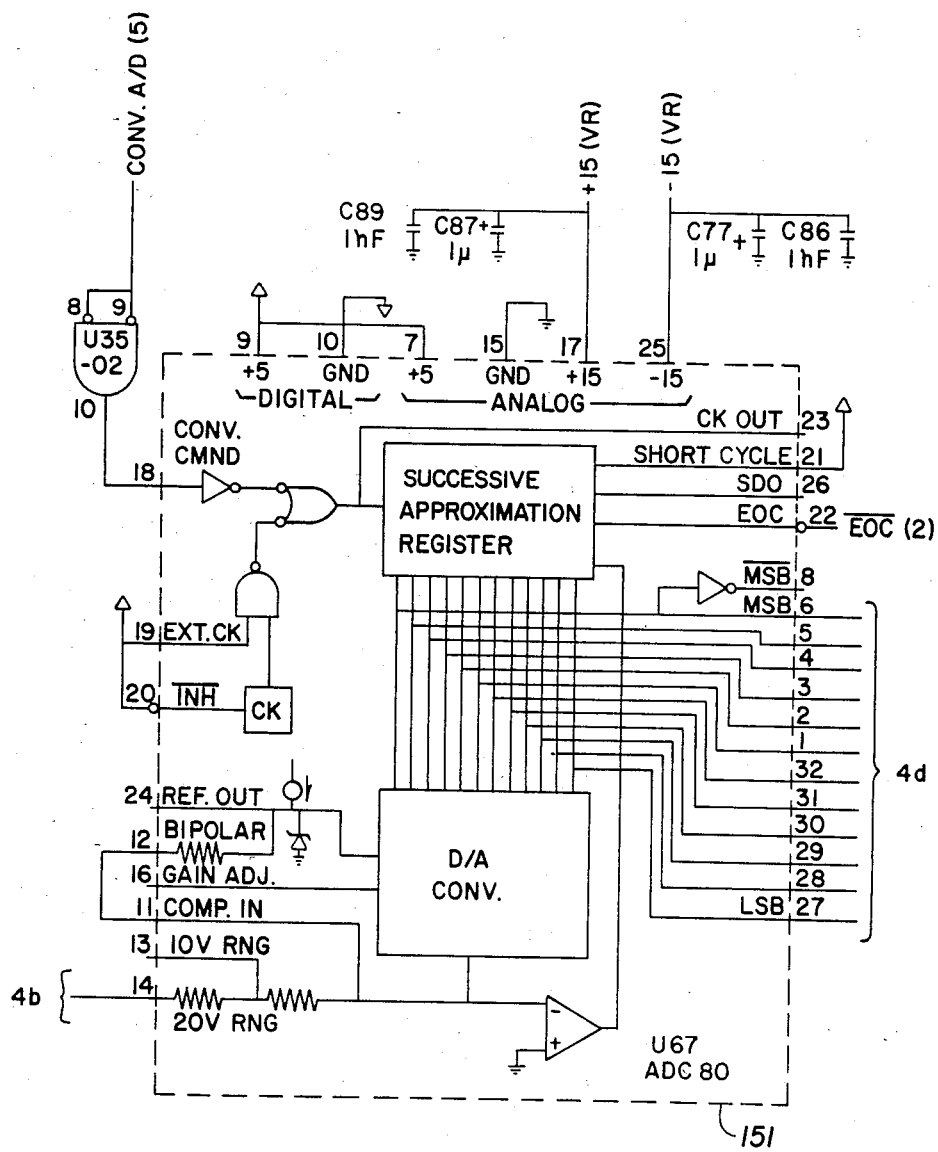
Figure 4D:
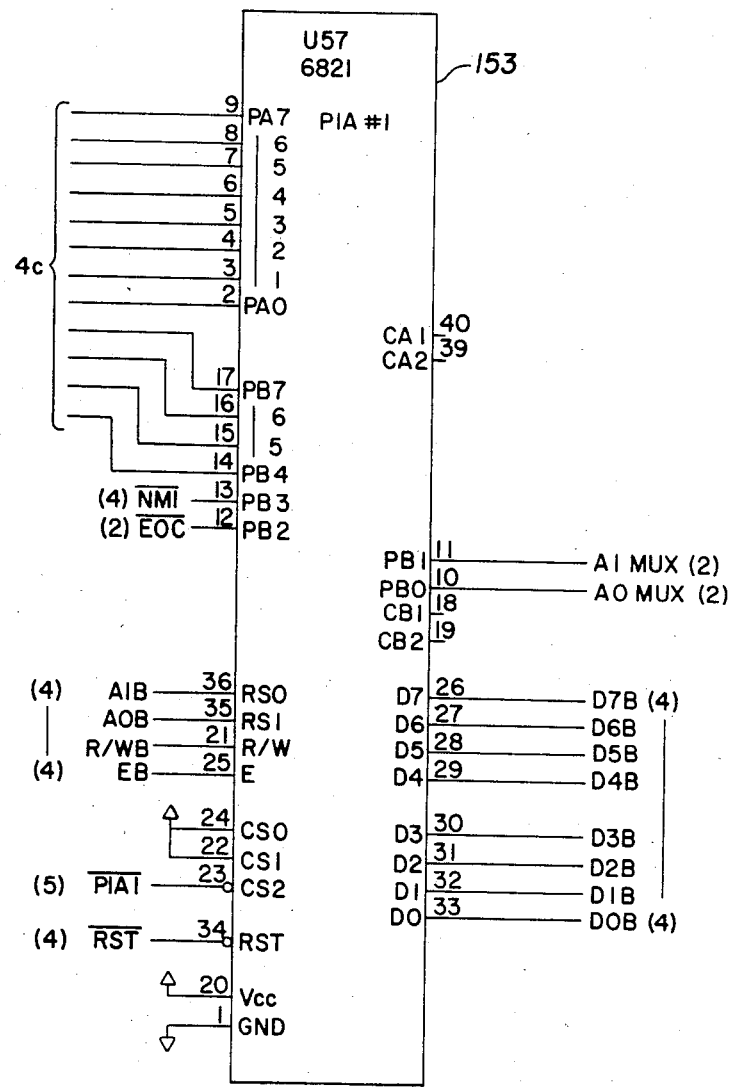

Referring now to FIG. 2, analyzer 10 is presented in block diagram form. As shown in FIG. 2, analyzer 10 comprises nine primary functional blocks. The central processing unit (CPU) 32 is operatively connected to a 16 bit common address bus 34 and to an 8 bit common data bus 36 which are used in the transferring of various types of information into and out of the CPU 32. Peripherally to the CPU 32, there are several functional elements, in the form of systems which are subsystems of the analyzer 10, which act in conjunction with the CPU 32 to either provide to the CPU, information received from sources external to the analyzer 10, receive information from the CPU 32 after the CPU 32 has operated on the information, transfer information between various functional elements or systems, etc. Details of the CPU 32 are shown in Appendix B. The notations of −244, −645 and −6809, each of which when preceeded by 74LS, gives the standard part number for the semiconductor devices comprising the CPU 32. Timer circuitry 38 is connected to the address bus 34 by line 40, to the data bus 36 by line 42 and to CPU 32 by line 43. Line 43 is the IRQ interrupt line. Timer 38 generates and provides the timing and clock pulses required for the operations of the analyzer 10 in the normal and well-known manner for the semiconductor device provided. Details of the inputs and outputs of timer 38 (designated U43, −6840, PTM) are shown in Appendix C. The notation −6840, when preceeded by 74LS, gives the standard part number for the semiconductor device. Decoder 44 is connected to the address bus by line 46 and to the various appropriate systems by line 48, which is the enable line. Decoder 44 operates in the normal and well-known manner to enable the various systems upon command from the CPU 32 so that the proper signals will be transmitted and received from the particular and correct system at the proper time. Details of the decoder 44 are shown in Appendix D. The notation −138 shown on the semiconductor devices in Appendix D, when preceeded by 74LS, gives the standard part number for the semiconductor devices comprising decoder 44.

The keyboard assembly 28 is operatively connected to address bus 34 by line 62, to the data bus 36 by line 64 and to decoder 44 by line 48. The keyboard assembly 28 is used by the operator to enter various data which is necessary for initializing the instrument to work with a particular engine or compressor cylinder. For instance, the bore of the cylinder, the stroke radius of the crankshaft, or with respect to the pressure calibration symmetry the operator might have to enter the full-scale range of the transducer or its sensitivity, many items of data which must be input to the instrument for its proper use are entered by using keyboard assembly 28. Details of the keyboard assembly 28 are shown in Appendix E and are comprised primarily of a 40 key, membrane keyswitch assembly available from the XYMOS Division of the W. H. Brady Co. and the necessary buffers.

The next system or subsystem is the CRT display controller 52 which is operatively connected to address bus 34 by line 54, to data bus 36 by line 56 and to decoder 44 by line 48. The display controller 52 provides composite video information to a data display unit 58 by line 60. The display controller 52 provides for the display of information on a CRT oscilloscope similar to a small TV screen located in the data display unit 58, which can functionally be any one of a number of available raster scan displays. Any alphanumeric data which needs to be provided for the operator's benefit, in this case all the data that the operator enters on the keyboard assembly 28, is stored alphanumerically on the CRT screen so that the operator may refer to it at any time to make certain that it is correct. Also, any information supplied back from the analyzer 10, such as the horsepower of the cylinder that is being analyzed or the rpm of the engine compressor that you are indicating and similar items are all displayed on this CRT data display 58. Details of the CRT display controller 52 are shown in Appendix F. The notation of −245, −367, −2114 and −6847, each of which when preceeded by 74LS, gives the standard part number for the semiconductor devices comprising the CRT display controller 52. In the preferred mode, the display controller 52 uses a Motorola 6847 video display generator device which contains its own character generator and timing logic for timing the output. It also includes a 3.58 megahertz colorburst clock and horizontal and vertical sync signal. Read/write memory was added for refresh memory.

A read/write memory 66 is operatively connected to address bus 34 by line 68, to data bus 36 by line 70 and to decoder 44 by line 48. Any data which is entered into the analyzer 10 or computed by the analyzer 10 which is of a dynamic nature, in other words which is created or entered when the analyzer 10 is being used, is stored in the read/write memory 66. In this particular embodiment, memory 66 is 4K 8-bit words. It must be sufficient to contain all the data that needs to be created by and entered into the analyzer 10. Details of the read/write memory 66 are shown in Appendix G. The notation of −2114 when preceeded by 74LS, gives the standard part number for the semiconductor devices comprising read/write memory 66.

Additional memory in the system is in the form of read-only memory (ROM) 72 which is operatively connected to address bus 34 by line 74, to data bus 36 by line 76 and to decoder 44 by line 48. ROM 72 contains the object code of the program which the CPU 32 is executing and also contains various constant values which might be necessary for any computations or display which might need to be performed by analyzer 10. The fixed data on the data display, for instance, the title headings and the alphanumeric title headings are all contained in this read-only memory in the form of text-type constants. Details of the ROM 72 are shown in Appendix H. The notation −2732/2716 when preceeded by 74LS, gives the standard part number for the semiconductor devices comprising ROM 72.

A sweep generator system 78 is included as a subsystem of analyzer 10 and is operatively connected to address bus 34 by line 80, to data bus 36 by line 82 and to decoder 44 by line 48. As previously noted, sweep generator system 78 is connected to the shaft encoder assembly 20 by line 18 and to the X-Y oscilloscope 22 by cable 24. Sweep generator system 78 includes at least 721 words of read/write memory. This memory can be written to by the CPU 32 and read by the display circuitry so that the CPU 32 can compute a table of piston position versus crank angle degree values which can then be written out to this read/write memory which is in the sweep generator system 78 and then which can be accessed by the sweep generator system 78 to provide the volume sweep output. The same sweep generator system 78 also produces the crank angle sweep and contains the circuitry which assures that the length of the sweeps is the same for all forms of sweep on the horizontal output which the analyzer 10 can produce. It has as its input, information from the shaft encoder 20 which is attached to the engine/compressor 16 and also the input from the CPU 32 in the form of this tabular data for the volume sweep. Also it receives, as input from the CPU 32, a reset signal which is used to synchronize itself to the motion which the operator is interested in analyzing, and it provides an output to the X-Y oscilloscope 22. Further details regarding the sweep generator system 78 will be given below with reference to a discussion of FIG. 3.

An additional system is the pressure data acquisition and scaling system 84 which is operatively connected to the address bus 34 by line 86, to data bus 36 by line 88 and to decoder 44 by line 48. The pressure data acquisition and scaling system 84 receives a signal from the pressure transducer 12 over cable 14, this signal being proportional to the pressure applied to the pressure transducer 12, and amplifies and converts that analog value into a digital word which is also proportional to the pressure applied to the transducer. The digital word can be accessed by the CPU 32 and recorded in a table in read/write memory by the CPU 32 so that a table of pressure values which exist instantaneously in the cylinder at each degree of crank angle rotation is built.

Additionally the pressure data acquisition and scaling system 84 provides, as an output, a signal over cable 24 to the vertical axis of the X-Y oscilloscope 22 which is the amplified and scaled pressure signal from the pressure transducer 12. It is this signal which can be adjusted to a particular member of psi per division of oscilloscope display. The pressure data acquisition and scaling system 84, in conjunction with information from the CPU 32, provides that scaling function. Further details regarding the pressure data acquisition and scaling system 84 will be given below with reference to a discussion of FIGS. 4 and 5.

In addition, an interface adapter 90 is operatively connected to the address bus 34 by line 92, to the data bus 36 by line 94 and to decoder 44 by line 48. Interface adapter 90 allows the analyzer 10 to be controlled remotely over some telemetry mechanism, as in phone lines or radio waves whereby, from some remote location, an operator can initalize the analyzer 10, input the proper data to it and read back the various parameters which it is capable of providing. Details of the interface adapter 90 are shown in Appendix I.

A set/reset flip flop 96 is connected to the shaft encoder 20 by line 100 which provides the one pulse per degree signal to the set/reset flip flop 96. The set/reset flip flop 96 provides an interrupt signal to CPU 32 over line 102 which is the NMI interrupt signal line. Also, set/reset flip flop 96 is connected to decoder 44 by line 48. In addition another set/reset flip flop 104 is connected to the shaft encoder 20 by line 18 which provides the one pulse per revolution signal to the set/reset flip flop 104. The set/reset flip flop 104 provides a readable output signal to the CPU 32 over line 108. Power supply 110 provides output voltages of +5 volts, +12 volts and ±15 volts to the appropriate connections to the various subsystem or subsystems of analyzer 10.

It should also be noted that there is not any particular reason why there should be a separate CRT for the data display 58 and an additional separate CRT for the X-Y oscilloscope 22. One can just as easily incorporate the data display on the same CRT. Analyzer 10 could easily incorporate a single CRT for both alphanumeric display and analog pressure, volume-pressure-time vibration, etc. That information will be selectable off a key pad input. The operator could be able to either select the screen to be the data display or the X-Y oscilloscope display.

After the operator has completed the hookup and synchronizing of the analyzer 10 to the engine/compressor 16, the operator is ready to being entering information via the keyboard assembly 28, said information describing the particular characteristics of the engine/compressor cylinder that the operator desires to analyze. The operator would press, on keyboard assembly 28, a keyswitch 30 labeled L/R.

The analyzer 10 then prompts the operator via the CRT display 26 to enter the connecting rod length of the engine or compressor and the stroke of the engine or compressor. This information is then recorded in read-/write memory 66 in the analyzer 10. The stroke is at that same time divided by 2 and stored as a value which is also the crank radius, the crank radius being defined as half the stroke. Then the analyzer 10 looks at the range of the values entered by the operator and compares them to predetermined values and alerts the operator if they fall outside those predetermined values which might indicate some sort of error had been made in entering the data. Analyzer 10 then computes the ratio of connecting rod length to crank radius which will always be within a certain range and if the ratio falls outside that range, the operator is also alerted that a mistake may have been made in making the entry. Then a keyswitch 30 labeled BORE is pressed and the operator enters in inches (all measurements are entered in inches, although the analyzer 10 could be programmed so that the operator could enter them in any unit of measurement desired) the bore of the cylinder. The entry of bore dimension is compared to known reasonable limits, and any error is displayed to the operator. After each of these numeric entries is made, a keyswitch 30 labeled ENTER is pressed which then notifies the CPU 32 to take the data that has just been keyed in and enter it. The entry sequence is completed by pressing the key called ENTER. Until that point, the digits can be edited, cleared out and re-entered. Once the operator presses ENTER, then the information that was previously keyed is entered in and processed by the CPU.

After the bore dimensions have been entered, the operator may enter the piston rod diameter dimension after pressing keyswitch 30 labeled PISTON BORE DIA. The piston rod diameter is only of interest if one is indicating double-acting compressor cylinders. It is not necessary to enter this information if one is only working with single acting cylinders, as in single acting compressor cylinders or power cylnders, but if one is measuring what is known as the crank-end horsepower of the double action compressor cylinder then one must enter the diameter of the connecting rod (which is called in the industry the piston rod) so that the volume occupied by that piston rod can be subtracted from the volume of the cyliner and accounted for in the computations for computing the indicated horsepower. In other words, one has to remove the volume taken out by the piston rod from the computational procedure because that volume does not produce any work. All of these parameters are analyzed for their accuracy by being compared to some wide range of known limits and the operator is always alerted if there has been some obvious error.

The next keyswitch the operator could press is one labeled TDC and this switch controls the synchronization of the instrument to the cylinder of interest. If the operator enters a TDC value of zero, which the operator would do if analyzing the reference cylinder, then the X-Y oscilloscope sweep, for instance, starts at zero degrees after top dead center of the reference cylinder. In this case, if the operator enters zero, it means that the analyzer is synchronized to top dead center of the reference cylinder. If the operator is going to analyze a cylinder which is at top dead center, for instance 120 degrees after the reference cylinder is at top dead center, then the operator would enter the value 120 and the instrument would known that it needed to start all of its sweep synchronization and computational referencing, 120 degrees after top dead center of the reference cylinder. The analyzer determines that by waiting for the one pulse per revolution signal to be entered. This signal has been earlier defined to be the top dead center of the reference cylinder. The analyzer 10 counts the number of degrees which occur via the one pulse per degree input signal, and when that number of degrees which are counted equals the number of degrees that the operator entered via the keyboard assembly 28, for example 120, analyzer 10 knows that the desired point or position has been reached.

After synchronizing the X-Y oscilloscope display via the TDC switch, the operator would press the PRESSURE/CAL keyswitch 30 and the CRT would then prompt the operator for the full-scale pressure transducer range which would be the full-scale range of the transducer that is connected at the present time (for instance 500 psi, 1000 psi, 2000 psi, or something in that nature). After entering that value, the analyzer 10 would prompt the operator for the sensitivity of the pressure transducer which is usually recorded on the body of the pressure transducer. This value does not change with time, only with damage to the pressure transducer, and that value might be in the neighborhood of 2.050 millivolts per volt. Upon entering these values into the analyzer 10, the analyzer has been calibrated. When the operator enters the full-scale range and sensitivity of the transducer into analyzer 10, the analyzer 10 automatically calibrates the vertical pressure display sensitivity that it outputs to 10 percent of the full-scale range per division, just so that it will end up being calibrated at something. It is not likely that the operator will be satisfied with 10 percent of the range. What that means is with a 500 psi transducer, the vertical output sensitivity is automatically adjusted to be 50 psi per division. Now, this again is just so that it will be set to something anyway. To whatever the sensitivity is automatically adjusted, it is displayed on the CRT screen so that the operator knows to what it is set. Then the operator would press a keyswitch 30 called PRESSURE DISPLAY SENSITIVITY which allows the operator to select some vertical sensitivity that might be more useful than the one that the analyzer selected; for instance, 10 psi per division, or 100 psi per division. After keying in that information, the analyzer 10 then displays on the CRT display, an oscilloscope vertical sensitivity setting, for instance, 0.01 volts per division or 0.5 volts per division or 1 volt per division; some value which the operator is expected to select on the vertical sensitivity control of the X-Y oscilloscope 22 so that having done that the vertical display sensitivity in the pressure output symmetry has been calibrated to be whatever the operator desired. In other words, one division of deflection on the X-Y oscilloscope 22 will be equal to the number of psi per division that was asked for when the operator entered the value.

There is an additional keyswitch 30 labeled ID# which puts an 8-digit number in the corner of the data display CRT which can be encoded by the operator so that were the operator to photograph that display, it would have a unique number on it for referencing purposes in any reports that might be prepared involving the use of this instrument. Having done the above things, the analyzer 10 is actually ready to indicate horsepower, for instance, and provide other information which the operator might be interested in obtaining.

All of the keyswitches we have talked about up to this point have been color coded and grouped in an area by themselves on the front of the analyzer. The color is not important, but the fact that they are grouped together and are all the same color is important because they are all used to enter data of a numeric nature into the instrument. On the instrument front panel is another group of keys of a different color which are referred to as command keys which do not require any information to be entered with their use. They cause events to occur the instant they are pressed. One of these keyswitches 30 is labeled IHP. Upon pressing this keyswitch 30, after a few seconds of computation, the analyzer 10 displays on the CRT screen the indicated horsepower of the cylinder to which the pressure transducer is attached. Below that keyswitch 30 is a keyswitch 30 labeled CRANK END IHP. If you press this keyswitch 30, analyzer 10 will subtract out the volume of the previously entered piston rod, the diameter of which you previously entered, and analyzer 10 will perform the indicated horsepower calculation under the assumption that there is a piston rod in the cylinder.

The next keyswitch 30 is labeled RESET AVERAGE IHP. The display below the IHP display on the CRT accumulates a running average of all of the values that were computed in the IHP portion of the display. If the analyzer 10 is analyzing a cylinder whose horsepower is changing a little bit with respect to time, one might want to accumulate an average of that horsepower. This display shows that accumulation. To reinitialize that average and to start a new average, the operator presses the RESET AVERAGE IHP keyswitch and the average is reinitialized.

There are two more keyswitches 30 labeled TDC FORWARD and TDC REVERSE. If it is required that the operator change the TDC setting which was originally set by pressing the TDC keyswitch 30 in entering some number value, say the operator would like to increment or decrement that value by just a few counts, then the operator can do so by pressing the TDC FORWARD and TDC REVERSE keyswitches 30. The TDC FORWARD keyswitch 30 increments that value at the rate of about two or three counts per second and the TDC REVERSE keyswitch 30 also decrements that value at the rate of about two or three counts per second. By changing the TDC setting from its normal setting the operator can make events appear to rotate either clockwise or counter-clockwise on the display, so the occurrence of a particular vibration event can be timed accurately. So, the operator adjusts the TDC setting until the portion of that vibration event is exactly aligned with the left hand boundary of the trace and then the TDC value is read from the CRT display and by subtracting the original TDC setting from this new value, the operator can obtain the relationship of the event to top dead center for the cylinder that is being synchronized to and from that information the operator can perhaps determine what might be causing that vibration. The TDC FORWARD and REVERSE switches make it easy to change that TDC setting. Rather than having to go TDC switch, number, ENTER, TDC switch, number, ENTER, so on and so forth to get to the final value, the operator can get close to it by going TDC switch, number, ENTER and the TDC FORWARD or TDC REVERSE until it exactly lines up.

Another keyswitch 30 is labeled PT/PV. The operator can tell by looking at the X-Y oscilloscope trace whether the trace is the volume based sweep of the crank angle based sweep. PT is pressure versus time or pressure versus crank angle, as it is called sometimes, and the PV is the pressure versus volume time signal. This PT/PV keyswitch is essentially a flip-flop sort of switch. If it is in the PV mode and the operator presses the PT/PV keyswitch, it switches to PT and if the keyswitch is in the PT mode and the operator presses the PT/PV switch, it switches to PV.

Below that is a keyswitch 30 labeled PRESSURE TRANSDUCER BALANCE. The pressure transducers all have some initial zero pressure offset signal condition which shows up in the display as an offset from zero volts. This offset signal needs to be cancelled out. To do that, the operator presses the PRESSURE TRANSDUCER BALANCE keyswitch 30 and holds it down for one second. The reason for the one second time delay is because if there is pressure applied to the transducer one would not want to accidently balance the transducer because of accidently touching the keyswitch.

Another keyswitch 30 is labeled VIBRATION FILTER IN AND OUT. This keyswitch also provides a toggle function. There is a line on the CRT display which indicates whether or not the vibration filter is in or out of the line. This keyswitch 30 toggles it to the alternate function. The vibration filter being a low pass filter is used to filter out information which is not of use to the operator under certain conditions.

The next keyswitch 30 is labeled TWO CYCLE/FOUR CYCLE. This keyswitch 30 also provides a toggle function. There is a line on the CRT which tells the operator whether or not the instrument is expecting to be attached to two cycle or four cycle type motion and the operator can toggle that to the alternate and/or correct condition by pressing this keyswitch 30.

There is a group of keyswitches 30 labeled SHIFT UP, SHIFT DOWN and SHIFT ZERO which apply a dc offset to the pressure trace which is being displayed on the CRT screen. To shift that entire pressure trace up, the operator would press the SHIFT UP key; to shift the trace down the operator would press the SHIFT DOWN key; and to return the trace to its original unshifted position, the operator would press the SHIFT ZERO key. Because the encoder assembly 20 provides one pulse per revolution of its rotation, it is possible for the analyzer 10 to synchronize to a top dead center position which is in fact 360 degrees away from the actual TDC position that the operator is trying to synchronize to on the four cycle motion. In other words, there are two top dead centers per complete engine cycle on a four cycle engine. One TDC is the top dead center which occurs just after the compression stroke, or at the top of the compression stroke. The other TDC is the top dead center that occurs at the top of the exhaust stroke. If by looking at the PT card the operator sees that the pressure peak is 360 degrees out of phase, the operator will press the four cycle correct switch and it resynchronizes the pressure peak to be at the beginning of the display instead of at the center of the display.

The last two keyswitches in the command series are labeled ARTICULATION and ROTATION CW/CCW. If one is indicating horsepower on an articulated cylinder, it is required that slightly more information than just the connecting rod length and the stroke be entered. That initial information being the articulation angle, the articulated length, and the articulated link rod length, which are all available off the data sheet for the engine or compressor. In addition, it is necessary to tell the instrument what direction the crankshaft of this particular engine rotates, which is done with the ROTATION CW/CCW key. Again, entering this information is done by the operator being prompted by the CRT display similar to the way the operator is prompted after having pressed the L/R key.

The additional keyswitches 30 on the analyzer are numeric keys from 0 through 9 and a CLEAR key for clearing out erroneous entries and a decimal point key for entering decimal fractions. That constitutes setting up the instrument for use and inputting information thereto. A look will now be taken at what happens to the data that has been entered by the operator, and by the transducers, into this analyzer 10. For example, when the operator enters at the front panel keyswitches 30 the connecting rod length and the stroke, a table of piston position versus crank angle degrees is generated by the CPU from that information and placed into a read/write memory 66. The CPU executes a program which calculates those piston positions by a known formula, and the output of this program is floating point numbers which are placed in the read/write memory 66 and used by another portion of the program in the computation of horsepower. At that same time, those normalized piston positions are converted from a floating point number, between 0 and 1 which is the normalized piston position, into an 8 bit integer value between 0 and 255 which still maintains the proper proportionality relationship with the original floating point number. There are 721 values which represent the sweep output at each degree between 0 and 721, the 721 value being for the possible four cycle operation. On a two cycle motion only 360 degrees of the table is used. The table is symmetrical about 360 degrees so that it is essentially two equal tables.

The other information that is entered indicative of engine compressor parameters, like bore and piston rod diameter, is written into read/write memory 66 and saved for use later in the computation of horsepower. When the operator enters the pressure transducer calibration information, the full scale pressure transducer range and the sensitivity of the transducer is recorded in read/write memory 66 and then the pressure transducer output scaling computation occurs. This scaling computation is a program which takes the information input at the keyboard assembly 28 (the full scale range at the pressure transducer sensitivity) and computes a factor by which the amplified pressure signal must be scaled in order to provide the display sensitivity which is desired by the operator. The scaling computation uses the transducer sensitivity, the transducer full scale range, the transducer excitation voltage and the gain of the combination of the two D/A converters used in the scaling circuitry to determine the output which is the ideal setting for the particular oscilloscope vertical sensitivity. The excitation voltage and the gain of the combination of the two D/A converters used in the circuitry are measured in each analyzer as they are being assembled and calibrated and those values are written permanently into ROM 72 so so the values can be used by the CPU 32 during the scaling computation. The output of the calculation is something in the nature of 0.73 volts per division. Most available X-Y oscilloscopes do not have an output of 0.73 volts or a selectable vertical sensitivity of 0.73 volts per division. It is necessary for the program to look through a table of available scope sensitivities which has been provided in ROM 72 which coincides with the vertical sensitivities available on the X-Y oscilloscopes that are furnished with the analzyer 10. This table can be changed to match any other X-Y oscilloscope that one might want to use. An available sensitivity is selected which is more sensitive than that actually needed and then through the multiplying D/A converter 160 that is shown in the FIG. 5a (detailed as U-72 multiplying D/A converter), a scale factor is computed. If the applied pressure signal is attenuated by the scale factor, then one will obtain the correct output voltage on the X-Y oscilloscope 22 if the vertical sensitivity is adjusted to that which the program determines would be correct. One of the inputs to this equation is also the gain of the pressure transducer instrumentation amplifier 146. That gain is calculated by a program stored in the analyzer 10. To calculate that gain, input multiplexer 140 switches to a known reference voltage internal to analyzer 10. This reference voltage is very accurately measured during the manufacture process of the instrument and recorded into read-only memory 72 so that at any time CPU 32 can switch the instrumentation amplifier 146 over to that reference voltage, measure it and determine what the gain of the instrumentation amplifier is by knowing what that reference voltage should actually be. This is essentially the self-calibration feature. The things which are calibrated during the short calibration program are (1) any changes in the input multiplexer 140, (2) any changes which might occur in the instrumentation amplifier 146, (3) any drifts or offsets which might occur in the sample and hold circuit 150 and (4) any gain changes or drifts which might occur in the A/D converter 151. That entire loop is calibrated by this self-calibration program. The gain which is calculated is used as an input to the equation for calculating the scale factor for the pressure output.

To calculate an indicated horsepower, one must solve an equation which is PLAN/33,000 where P is the indicated mean effective pressure in the cylinder which is defined to be the pressure which if applied for the entire cycle of the cylinder that one is measuring would do the same work as the varying pressure which is actually applied during that cycle. It is the integral of pressure with respect to volume called IMEP. L is the stroke of the cylinder or the piston in the cylinder, in feet. For purposes of calculating or solving the equation, L is actually entered in inches by the operator but converted to feet by the CPU 32. A in the equation is a cross-sectional area in square inches and N is the the RPM (it is N for two cycle motion and 2N for four cycle motion). Then dividing by 33,000 just scales all of these numbers into the engineering units of horsepower. In order to calculate horsepower, the analyzer 10 must first integrate the pressure volume curve and then measure the speed of the motion and then insert the other constants into the equation to solve the equation. In order to integrate the pressure volume curve, the CPU 32, under program control, causes the A/D converter 151 and the sample and hold circuit 150 to read the instantaneous pressure in the cylinder at each crank angle degree for either 360 or 720 degrees (depending on whether there is two cycle or four cycle motion) and store those instantaneous pressure values as 16 bit words, 12 bits of which are significant in read/write memory 66 in the analyzer 10. After having access to the stored pressure values and after having measured the period of the revolution when the pressure was read, one can compute the RPM at which the engine was turning during the particular revolution. Then one can use a standard trapezoidal method of incrementally integrating a closed function. Once can, by multiplying the change in volume at each degree by the pressure applied during that degree and summing those pieces up, effectively perform the integral of pressure with respect to volume. It is a piece-wise approximation with the pieces being small enough to provide a very accurate approximation of the actual integral. That integral is preformed by the method just described and its value is scaled by the various pressure transducer scaling coefficients into an actual true indicated mean effected pressure value and then that is inserted into the PLAN/33,000 equation and the equivalent horsepower is calculated and displayed on the CRT. The calculations are essentially the same whether one is doing two cycle or four cycle horsepower. If one is doing four cycle, one just integrates two cycles instead of one (two revolutions instead of one) and divides the RPM figure by 2 which is essentially the only difference between the calculations for each of them. The CPU 32 determines which of those methods to use depending on whether the operator has the analyzer 10 set for two cycles or four cycles. If one is measuring crank end horsepower, the way the analyzer 10 knows this, is that the operator must press the CRANK END IHP keyswitch 30 instead of just the IHP keyswitch, then analyzer 10 knows to subtract out the volume of the piston rod. The manner in which this is done is by subtracting the cross-sectional area of the piston rod (which is computed by knowing the diameter of the piston rod entered) from the cross-sectional area of the cylinder. Just prior to measuring these instantaneous pressures for each crank angle degree, a calibration is performed on the analog section (the same calibration that was just described being done for the pressure transducer calibration circuitry) so that the latest system calibration is available for the program so any long term drift that might have occurred since the last time it was calibrated is taken care of instantaneously.

The CPU 32 does some more things with some of this information. If the motion is articulated, then the equation for computing the table of piston positions versus crank angle is considerably more complex and drawn out than the one doing it for an unarticulated motion. It requires three other parameters to be used in the equation. These three parameters are articulation angles, lead rod lengths and articulated lengths which are entered by the operator. That same table is built and the same sweep table is written out to the sweep circuitry. The value at each point is going to be a little different for each particular cylinder that is being described. The only difference between articulated and unarticulated motion is the equation being used to calculate the piston position table that is selected by the program, depending on whether or not the operator presses L/R or ARTICULATION to calculate the statement.

With reference to FIGS. 3a through 3d, the sweep generator system 78 is disclosed. The sweep generator system 78 must be able to provide, for the horizontal deflection of the X-Y oscilloscope 22, a signal which is proportional to the angle of rotation of the crankshaft with respect to top dead center or the position of the piston with respect to top dead center. The signal which is proportional to crank angle is called crank angle sweep in the industry. That signal is essentially a linear sawtooth which starts out, for instance, at 0 volts and ramps up in a linear fashion to some full scale voltage, for instance, in this discussion 10 volts, and then is instantaneously reset to 0, which indicates the 360th or 720th degree of rotation. The sweep drives the beam on the X-Y oscilloscope 22 in a horizontal direction from the left hand extremity of the screen to the right hand extremity of the screen in a fashion which is proportional to the rate at which the crankshaft is turning. In other words, it moves in one discrete step for each degree of rotation of the crankshaft which is indicated by a free pulse being output by the crank angle encoder 20 which is used as input to this circuit. The portion of the hardware which provides that circuit consists of a 10-bit binary counter 112 operatively connected over cable 114 to a switching means 116 for gating the various output stages of that binary counter 112 to the input of the D/A converter 118 over cable 120. The output of D/A converter 118 is transmitted over cable 122 to D/A converter 124. D/A converter 124 is of the multiplying variety which is used as a scaler to scale the amplitude of the output sawtooth to some desired value. This scaling multiplying D/A converter 1234 is used as essentially a potentiometer which can be controlled by the CPU 32. It is used to assure that the lengths of the crank angle sweep is the same in both two cycle and four cycle operation. Also the crank angle sweep is exactly the same length as the volume sweep will be. The manner in which the crank angle sweep is generated is that the 10 bit binary counter 112 (and it is 10 bits because it must be able to count up to a maximum of 720 because of the 720 degrees in two revolutions of the four cycle motion) is clocked by the one pulse per degree signal input on line 126 from the encoder assembly 20 and is reset periodically by a sweep reset signal on line 128 which is produced by the CPU 32. Assuming counter 112 has just been reset, its output will have logical 0's in all ten of its output digits which will produce an analog output of 0 volts from the D/A converter 118 and D/A converter 124. These output bits of the counter 112 are transmitted to the inputs of D/A converter 118 through switching means 116. Switching means 116 is essentially 10 pole, 2 throw switches which can gate the output of the counter 112 either to the D/A converter 118 or the address lines 130 of read/write memory 132 which will be discussed later. In the crank angle sweep function, switch means 116 gates the output of the counter 112 to the D/A converter 118. If the output of all the counter 112 flip-flops are 0 then the output of the D/A converter 118 would be 0. As the counter 112 is incremented from 0 up to some non-zero value in incremental counts, for instance by 1 as in 0, 1, 2, 3, 4, and these counts are equivalent to the number of degrees of rotation that have occurred during that time then the output of the D/A converter 118 increases in a stair-step fashion some discrete amount for each increase in count of the counters 112. If the counter 112, for instance counts from 0 to 359, which would be the equivalent of a crankshaft rotation of 360 degrees, then the output of the D/A converter 118 will increase from 0 volts to some value which is proportional to an input count of 359. The gain of the D/A converter 118 is adjusted such that the amount that it travels is in this case 10 volts which is a convenient value for it to be for purposes of display on the X-Y oscilloscope, but it could be any convenient value. When in four cycle operation, the counter 112 is allowed to count from 0 to 719 so consequently if one did nothing to prevent it, the output of the D/A converter 118 would go from 0 to 20 volts or twice what it had at a count of 0 to 359 but the multiplying D/A converter 124 is used to scale that output back down to 10 volts by essentially dividing it by two. The voltage to the X axis of the X-Y oscilloscope is transmitted on lines 152 and 154. The thing that prevents the counter 112 from counting above 359 or 719 is the reset signal on line 128 from the CPU 32 and the mechanism which provides the reset signal is that at the instant the analyzer 10 receives the one pulse per revolution signal from the crank angle encoder 20 a 16 bit data value in read/write memory 66 is set to 0 and each one pulse per degree signal that is received from the crank angle encoder 20 by the analyzer 10, that 16 bit data value is increased by one. In other words, one is added to it algebraically and its value is compared by instruction to the CPU 32 with another 16 bit value which has been entered from the keyswitches 30 by the operator. This other value is the number of degrees after top dead center of the reference that one would like the X-Y oscilloscope 22 sweep to start to sweep. So, if this 10 bit binary counter 112 starts at an output of 0 when the cylinder of interest is at top dead center and then the sweep increments up from 0 in a linear fashion becase this counter 112 being clocked by one pulse per degree signal from the crank angle encoder 20 and then the sweep is synchronized to the motion of the cylinder of interest. In other words, the sweep starts when that cyinder is at top dead center and the sweep is instantaneously reset to 0 when that cylinder reaches top dead center again. In the case of four cycle motion, the counter 112 is allowed to count up to 719 before it is reset to 0 and the way the computer knows to let it do that is because the operator entered the data that it is four cycle motion and the analyzer 10 is aware of that information and also the one pulse per revoltuion signal from the crank angle encoder 20 is effectively divided by two in software. In other words, it is ignored except for every other time that it occurs. The effect is that the sweep is twice as long in the four cycle position in time and would be twice as long in amplitude if it were not for scaling.

The volume sweep is generated by the sweep system. The information about the bore and stroke and all the articulated data (if one is talking about articulated motion) is entered by the operator at keyswitches 30. From that input data a table of piston positions versus the crank angle degree is computed. There is a table which has a one-to-one correspondence between some crank angle degree, say 15 degrees, and how far the piston is in distance down from top dead center in the cylinder at that degree. At 0 degrees the piston is at the top of the cylinder or at the top dead center and there is lowest volume. It may not be geographically at the top and at bottom dead center. At least on unarticulated motion the piston is at the very lowest extreme in the cylinder and the volume is the greatest that it can be. That is not the case with articulated motion because the largest swept volume occurs at something other than bottom dead center. Unfortunately it is offset a few degrees one way or the other from bottom dead center but essentially that is the way the table is organized. That table is converted from real numbers into a table of 8 bit binary values ranging from 0 to 255 which has the same relationship as the original numbers. TDC is at table location 0 and is equivalent to 0 degrees top dead center when the value is 0. At bottom dead center, or 180 degrees, the value would be 255 and at all the degrees between 0 and 180 the value is some value between 0 and 255 and is proportional to where the piston is in the cylinder. That table of values is written out into read/write memory 132 which is associated with the sweep generation circuitry and that read/write memory 132 has to hold at least 721 eight bit words which are all the possible sweep values which might occur between 0 degrees and 720 degrees. This read/write memory 132 is attached to the CPU 32 address and data buses via switches 136 and 138 in such a way that it can be written into just like regular data storage read/write memory. Additionally, this read/write memory 132 can be addressed and switches 136 can be set by the CPU 32 such that it is essentially isolated from the CPU 32 bus and its address can be provided by the output of the binary counters 112 (the 10 bit binary counter which was the subject of the crank angle sweep discussion). That output can be used to address the read/write memory 132 and the 8 bit data output lines 134 from the read/write memory 132 can be directed to the eight most significant bits of the D/A converter 118 so that the 8 bit binary in each memory location in read/write memory 132 can be converted into its equivalent analog output value by the D/A converter 118 previously described in the crank angle sweep generation source. What we have is a table of values proportional to the piston position in each crank angle degree which can be written out to the D/A converter 118 by incrementing the counter 112 from 0 to 359 or 0 to 719 degrees by the same one pulse degree signal that incremented it before and it can be reset to 0 periodically by the same sweep reset signal provided by the CPU 32 under the same conditions that were provided before. In this case, the sweep being produced is nonlinear sweep which is proportional to distance position rather than the linear sweep which is proportional to crank angle rotation. If left alone, the sweep which has the lowest ultimate amplitude would be the volume sweep so that the other two sweeps (the two cycle crank angle sweep and the four cycle crank angle sweep) are scaled by the multiplying D/A converter 124 so that they are no greater than the maximum amplitude of the volume sweep. All three types of sweep are exactly the same ultimate amplitude. Consequently, once one sets up the horizontal axis on the X-Y oscilloscope to trace out the distance that one wants it to be, then one does not have to change that when one changes types of sweep.

Referring to FIGS. 4a through 4d and 5a and 5b, the pressure data acquisition and scaling subsystem provides for a means of reading the instantaneous pressure determined by the pressure transducer and converting that information to a digital value and inputting that digital value to data storage memory in the analyzer 10. The part of the system which allows one to do that is a four channel differential multiplexer 140, the channels of which can be selected from the analyzer 10. The analyzer 10 can, under program control and prompting by the operator, select the channel that is input. That inputted channel then goes over lines 142 and 144 to the differential inputs of a differential instrumentation amplifier 146 which has an approximate gain of 500. The output of this instrumentation amplifier 146 then goes over line 148 to an alternate section of the circuit and it also goes over line 149 to a sample and hold device 150 which under CPU 32 control can hold the steady value of the instantaneous pressure. In other words the instantaneous pressure can be made to not change while that value is measured by a 12 bit analog-to-digital (A/D) converter 151 in this case and that digital value is proportional to the pressure applied and it can be read through I/O port 153 from the A/D converter 151 by the CPU 32 under program control and stored. That value can be stored in the read/write memory 66 in a table of pressures. That table is either 360 or 720 entries deep depending on whether or not one is doing two cycle or four cycle motion. That particular method of accessing and converting to a digital value of pressure can be done in any number of different ways. In other words, the critical parts of the particular design are the speed at which the analog-to-digital converter can convert the value. In this case it happens in about 25 microseconds which is just fast enough. It needs to take no longer than about 25 microseconds to convert the analog value to a digital value, that is the case here. It can be shorter than that of course. The reason is because of the finite time between degrees. One needs to be able to sample the pressure at least once each degree. One of the unique aspects of this subsystem is the means which does not allow any initial offset which might be present on the pressure transducer. The strain gauge pressure transducers always have some initial output with 0 pressure applied to them. One needs to know that output at 0 pressure and the conventional way of doing that is by applying some sort of variable resistance across one or more legs of the strain gauge transducer until the output goes to 0. It is not very convenient to do and can be improved upon, and in this case has been. The output is nulled in this instrument by adjusting the reference voltage for the instrumentation amplifier 146 in an equal and opposite direction from the offset voltage. In other words, if there is one volt of initial offset, then the reference voltage is changed by negative one volt which algebraically cancels the offset voltage. If the offset voltage were negative 1.25 volts, then one would apply 1.25 volt change to the reference input which would again cancel this voltage. This cancelling signal is applied via line 158 from D/A converter 156, the output of which is controlled by the analyzer 10. Another way the balance is performed is the 0 pressure output voltage of the instrumentation amplifier 146 is sampled by the sample and hold circuit 150 and then converted to a digital value by the A/D converter 151 and read into the CPU 32 and if it is not 0 then its polarity is determined and one increment of adjustment voltage (with the opposite sign to the offset) is output from the D/A converter 156 and hence to the reference voltage on the instrumentation amplifier 146 so that the offset voltage then has been made smaller by one small increment. This procedure is repeated by measuring the offset and determining its sign and outputting an adjustment increment of the opposite polarity until the sign of the offset changes. In other words, if the offset is positive then the compensating signal is made negative, incrementally, until the offset crosses through 0 and becomes just negative. If, on the other hand, it is negative to start off with, one adjusts it in the positive direction until it is just positive. If the adjustment steps are made small enough, then the offset never becomes exactly 0 but it only differs from 0 by at most one of these adjustment steps and in this case the adjustment steps are made to be approximately 1½ millivolts, so that the transducer offset is balanced out or zeroed out to within 2½ millivolts of actual 0 volts which is quite adequate for purposes of engine compressor analysis.

Of other channels on the input multiplexer 140, one channel goes to the pressure transducer, another channel goes to analog ground. In other words, the value of analog ground can be measured and is not necessarily 0 volts. It will always be some small value other than 0 volts because it drops across various circuits. A third channel goes to a reference voltage which is in the neighborhood of 20 millivolts and is very stable with time and temperature and has been measured to five significant digits of accuracy and its value has been recorded in read/only memory 72 when the particular instrument is prepared for delivery to the customer. These additional channels of the multixplexer are used during the auto calibration portion of the instrument. The gain of the pressure conditioning and measuring circuitry can be measured by the analyzer 10 and the gain be adjusted for any changes which occur. The sources of loop gain error can be lumped into one error term and the correction be done by adjusting the value used for the gain of the instrumentation amplifier 146. One would measure the 20 millivolt reference voltage very precisely and record the value in ROM 72. The sequence for self-calibration would consist of (1) read and record the present value of ground, (2) read and record the present value of the amplified reference voltage, and (3) amplifier gain is equal to step two minus step one divided by the recorded reference voltage.

Figure 5A:
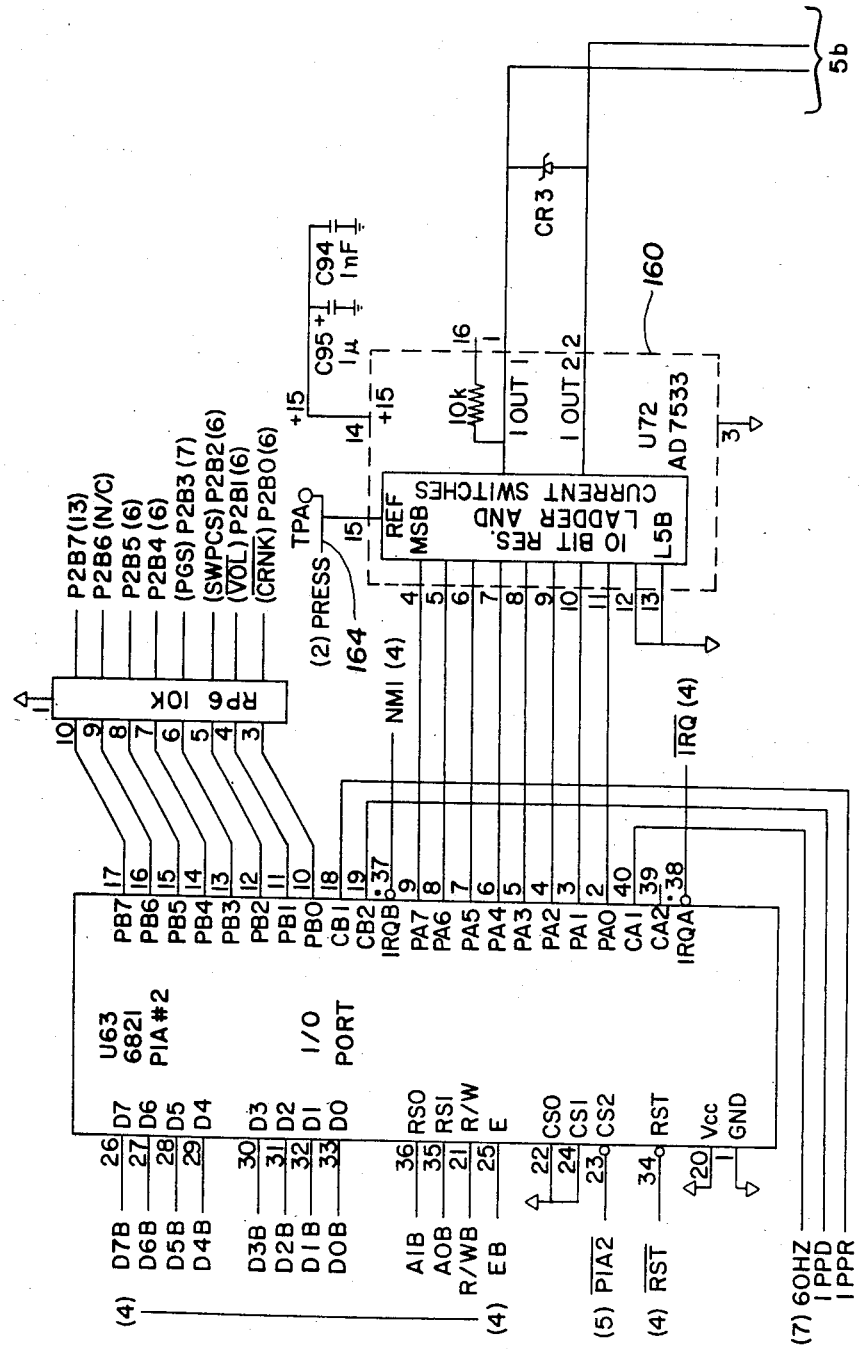
FIGS. 5a and 5b are a simplified schematic diagram of a second portion of the pressure data acquisition and scaling subsystem.
Figure 5B:
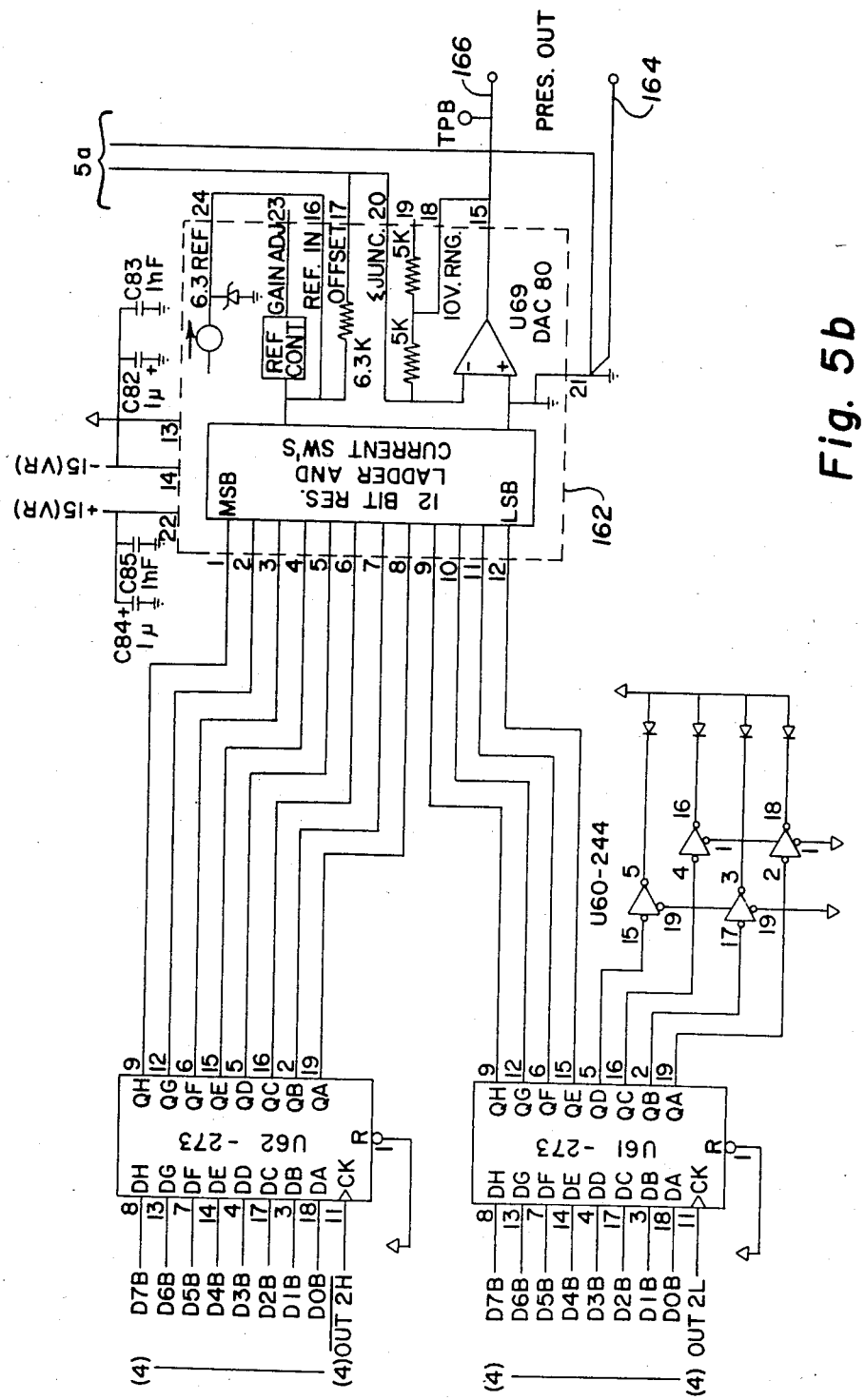

The other half of the pressure scaling portion of this analog subsystem is detailed in FIGS. 5a and 5b and it consists of essentially a multiplying D/A converter 160 used as a computer control potentiometer and another D/A converter 162 which is used to algebraically sum the dc voltage into the pressure output signal for purposes of shifting the dc level of the dc output signal (either positive or negative) for enhancing various aspects of the display. The input to these circuits is the pressure signal immediately after it leaves the instrumentation amplifier 146. It goes into two paths, one of which goes through the sample and hold circuit 150 that was mentioned earlier and the other path goes to this portion of the circuit where it enters the reference terminal 164 for the multiplying D/A converter 160. The multiplying D/A converter 160 has the characteristics of having on its output, a value which is the product of the reference voltage input and the decimal fraction which is represented by a digital word placed on its input. In other words, one can scale the reference voltage by a value of between 0 to almost 1 of the reference voltage input value. If one puts a binary 0 on the input of the multiplying D/A converter 160 and then one multiplies the reference voltage by 0, hence one gets 0 out. If one puts a binary 255 on the input to the multiplying D/A converter 160 and it is an 8 bit D/A converter as it is in this case, one gets the reference multiplied by the decimal fraction equal to 255 divided by 256 which is practically one. Effectively, one can scale this pressure which is being used as a reference input from zero to full scale. That scaled value is then summed algebraically with a dc level which is of the range plus and minus 2½ volts so that this dynamic pressure signal can be superimposed on a dc level which can vary about 0 volts by plus or minus 2½ volts. The way the scaling factor is determined is that the CPU 32 solves an equation which was mentioned earlier and which will be detailed below. The scale factor that is determined by this equation is then written onto the input 8 bits of this multiplying D/A converter 160 and it is latched there so that the scale factor stays and then consequently, the pressure signal which flows through this multiplying D/A converter 160 is attenuated by a value proportional to the scale factor. Then the dc value with which it is summed by the D/A converter 160 is also latched onto the input of the D/A converter 162 which is in this case a 12 bit bipole of D/A converter and the value is latched onto the input of it also. It is placed there under program control by the CPU 32 and is incremented periodically. If one wishes to shift that value up, one presses the SHIFT UP keyswitch 30 and that 12 bit value is incremented so that the dc output value goes up by one step and if one wants to shift down, one presses the SHIFT DOWN keyswitch 30 and the digital 12 bit value is decremented so that the dc output goes down by one step. It either increments or decrements by about three steps per second or for as long as one holds either of the keyswitches 30. When one shifts the SHIFT ZERO keyswitch 30, the microprocessor latches the value for zero dc volts shift onto the input of the D/A converter 162 so that there is no longer any dc offset applied or summed. The output from D/A converter 162 to the Y axis of the X-Y oscilloscope 22 appears on leads 164 and 166. The function used to calculate the scale factor has as it inputs, the pressure transducer sensitivity, the excitation voltage, (excitation voltage being a constant that it stores in the program's memory) amplifier gain, (this is the instrumentation amplifier's gain, which is calculated periodically under program control) and the full scale output of the D/A converter in the desired number of psi per division or force per unit area which the operator would like to have as the vertical pressure scale. The product of all those terms is divided by the analog-to-digital converters full scale value and full scale pressure which is entered by the operator and 1,000 which makes all the units come out correctly. The mathematical representation of the above formula is shown as $V_D = (SENS_{XDUCER}) \times (EX) \times (G) \times (FSO_{MDAC}) \times (SENS_{DISPLAY}) \div (FSI_{ADC}) \div (FSI_{XDUCER}) \div (1000)$ where:

$V_D$ = desired volts per division $SENS_{XDUCER}$ = transducer sensitivity in millivolts output full scale per volt of transducer excitation $EX$ = transducer excitation in volts D.C.

$G$ = amplifier gain of output volts/input volts $FSO_{MDAC}$ = full scale output of multiplying digital to analog converter in volts $SENS_{DISPLAY}$ = pressure display sensitivity in psi per division $FSI_{ADC}$ = full scale input of analog to digital converter in volts $FSI_{XDUCER}$ = full scale input of pressure transducer in psi. When one solves this equation, one gets a desired X-Y oscilloscope vertical sensitivity in volts per division. It will probably come out something like 0.73 volts per division or 0.17 volts per division or something that is not normally on the front of the oscilloscope. One then needs to further scale the pressure value so that an exact switch selectable number of volts per division can be used on the X-Y oscilloscope.

MICROFICHE APPENDICES APPEAR IN PATENT FILE 4,456,963 OF PATENT APPLICATION Ser. No. 262,761 FILED MAY 11, 1981 AND INCORPORATED HEREIN BY REFERENCE.

Appendix b is a simplified schematic diagram of the central processing unit.

Appendix C is a simplified schematic diagram of the timer.

Appendix D is a simplified schematic diagram of the decoder.

Appendix E is a simplified schematic diagram of keyboard assembly.

Appendix F is a simplified schematic diagram of CRT controller.

Appendix G is a simplified schematic diagram of the read/write memory.

Appendix H is a simplified schematic diagram of the ROM.

Appendix I is a simplified schematic diagram of the interface adaptor.

Although the present invention has been described with reference to a presently preferred embodiment, it will be appreciated by those skilled in the art that various modifications, alternatives, variations, etc. may be made without departing from the spirit and scope of the invention as defined in the appended claims.

What is claimed:

1. In apparatus for measuring and displaying indicated power of a reciprocating piston machine including a common data bus, a common address bus, a decoder, a central processing unit, a read only memory, a read/write memory, a keyboard assembly, a display controller, a display device, a pressure data acquisition and scaling system, set/reset flip flops and a timer, an improved method of calibrating said pressure data acquisition and scaling system to eliminate inaccuracies due to temperature related changes in component values and changes in component values due to component aging comprising the following steps which are performed just prior to reading the value from a pressure transducer providing pressure indication from a cylinder of the reciprocating piston machine:

switching a signal source selector means to a ground reference signal;

applying the ground reference signal to an instrumentation amplifier where the ground reference signal is amplified;

sampling the amplified ground reference signal and applying the amplified ground reference signal to an analog to digital converter, the output of which is read by the central processing unit and the value stored in a first predetermined location in said read/write memory;

switching the signal source selector means to a reference voltage signal whose value has been predetermined to be of such an amplitude, after amplification by the instrumentation amplifier, to be near but not greater than the full scale input range of said analog to digital converter;

applying the reference voltage signal to said instrumentation amplifier where said reference voltage signal is amplified;

sampling the amplified reference voltage signal and applying the amplified reference voltage signal to said analog-to-digital converter, the output of which is read by the central processing unit and the value stored in a second predetermined location in said read/write memory;

subtracting the value of the amplified ground reference signal stored in said first predetermined location in the read/write memory from the value of the amplified reference voltage signal stored in said second predetermined location in the read/write memory and storing the difference value in a third predetermined location in the read/write memory;

dividing said difference value stored in said third predetermined location in the read/write memory by the value of the unamplified value of the reference voltage signal stored in the read only memory during the manufacture of the apparatus; and writing the value resulting from the division operation into a fourth predetermined location in said read/write memory, said value representing the exact amount the pressure transducer signal has been amplified by the data acquisition system and said value is used by the central processing unit to calculate the true and correct value of pressure applied to the pressure transducer.

2. In apparatus for providing and displaying crank angle and piston position related events of a reciprocating piston machine for the purpose of indicating possible need for preventive maintenance of said reciprocating piston machine and including a common data bus, a common address bus, a decoder, a central processing unit, a read-only memory, a read/write memory, a keyboard assembly, a display device, a display controller, a sweep generator system, a pressure data acquisition and scaling system, set/reset flip flops and a timer, an improved method of scaling an amplified signal from a pressure transducer for display purposes, comprising the steps of:

entering the value of the full scale range of the pressure transducer at the keyboard assembly and transferring said value of the full scale range to a first predetermined location in the read/write memory;

entering the value of the sensitivity of the pressure transducer at the keyboard assembly and transferring said value of the sensitivity to a second predetermined location in the read/write memory;

entering the desired value of display sensitivity in pounds per square inch per display division at the keyboard assembly and transferring said desired value of display sensitivity to a third predetermined location in read/write memory;

solving the following equation: (desired volts per division equals the value of the pressure transducer sensitivity times the value of an excitation voltage applied to the pressure transducer times the value of amplifier gain times the value of a scaling digital-to-analog converter full scale output range times the value of the desired value of display sensitivity divided by 1000 divided by the value of an analog to digital converter full scale input range divided by the pressure transducer full scale input range), said computation being performed by the central processing unit in accordance with instructions stored in the read-only memory and using values for the variables and constants in the equation which are stored in read/write memory and in read-only memory:

storing the value computed for the desired volts per division in a fourth predetermined location in read/write memory;

comparing the computed value for the desired volts per division with a table of values, stored in read-only memory, for the available values of volts per division of sensitivity for the particular display to be used with the apparatus;

determining a value in the table of values which is equal to or less than the desired volts per division;

dividing the value found in the table of values by the desired volts per division and multiplying by a predetermined value to obtain an attenuation factor, said predetermined value being the full scale digital input range of a multiplying digital-to-analog converter; and applying the value of the attention factor to the digital input of a multiplying digital-to-analog converter whose full scale range equals said predetermined value used to obtain the attenuation factor; whereby the representations of the pressure in the cylinder displayed on the display device is at the desired display sensitivity of pounds per square inch per division.

* * * * *

UNITED STATES PATENT AND TRADEMARK OFFICE
CERTIFICATE OF CORRECTION

PATENT NO. : 4,547,859
DATED      : October 15, 1985
INVENTOR(S): Gene D. Wiggins It is certified that error appears in the above-identified patent and that said Letters Patent is hereby corrected as shown below:

In column 7, line 6, "member" should read---number---

In column 8, line 27, "cylnders" should read---cylinders---

In column 8, line 33, "cyliner" should read---cylinder---

In column 13, line 59, "Once" should read---One---

In column 18, line 49, "1½" should read---2½---

Signed and Sealed this

Seventeenth Day of December 1985

[SEAL]

Attest:

DONALD J. QUIGG

Attesting Officer

Commissioner of Patents and Trademarks